US009644938B2

(12) United States Patent
Noll et al.

(10) Patent No.: US 9,644,938 B2
(45) Date of Patent: May 9, 2017

(54) DEVICE AND METHOD FOR SURFACE PROCESSING HAVING A TEST STATION

(75) Inventors: Werner Noll, Huebingen (DE); Patrick Kreutz, Koblenz (DE)

(73) Assignee: Ball Packaging Europe GmbH, Ratingen (DE)

( * ) Notice: Subject to any disclaimer, the term of this patent is extended or adjusted under 35 U.S.C. 154(b) by 26 days.

(21) Appl. No.: 13/386,464

(22) PCT Filed: Aug. 4, 2010

(86) PCT No.: PCT/EP2010/061369
§ 371 (c)(1),
(2), (4) Date: Jan. 23, 2012

(87) PCT Pub. No.: WO2011/015608
PCT Pub. Date: Feb. 10, 2011

(65) Prior Publication Data
US 2012/0119725 A1    May 17, 2012

(30) Foreign Application Priority Data

Aug. 4, 2009  (DE) .................. 10 2009 028 228

(51) Int. Cl.
*G01R 19/00* (2006.01)
*G01B 7/02* (2006.01)
(Continued)

(52) U.S. Cl.
CPC .............. *G01B 7/023* (2013.01); *B41F 17/08* (2013.01); *B41F 33/02* (2013.01); *B41J 3/4073* (2013.01)

(58) Field of Classification Search
CPC ......... B41F 17/20; B41F 17/08; B41J 3/4073; G01R 19/00; G01R 29/12; G01N 27/92; G01N 2021/1791; G01B 7/023
(Continued)

(56) References Cited

U.S. PATENT DOCUMENTS 3,746,165 A * 7/1973 Ford et al. ................. 209/524
4,242,561 A   12/1980 Long
(Continued)

FOREIGN PATENT DOCUMENTS

AU   WO 2008025063 A1 * 3/2008 ........... B65B 57/10
CH             695555        6/2006
(Continued)

OTHER PUBLICATIONS

International Search Report prepared by the European Patent Office on Jan. 25, 2011, for Internatonal Application No. PCT/EP2010/061369.
(Continued)

*Primary Examiner* — Son Le
*Assistant Examiner* — Brent J Andrews
(74) *Attorney, Agent, or Firm* — Sheridan Ross P.C.

(57) ABSTRACT

The invention relates to a device for treating surfaces of objects with rounded cross sections and at least one partially electrically conductive outer wall, comprising a plurality of treating stations; and a feed device including support devices for supporting objects to be treated, wherein the feed device is configured to transport the objects supported by a respective support device in a timed sequence from one treating station to another treating station, wherein one of the treating stations is a test station and includes a voltage source, an electrode coupled with the voltage source and a processing unit, wherein the processing unit is configured to detect voltage changes between the electrode and a respective object disposed at the respective test station. The invention also relates to an accordingly configured test station for a device for treating surfaces of objects with rounded cross sections and at least one partially electrically conductive outer wall and to a method for treating surfaces of objects (Continued)

with rounded cross sections and at least one partially electrically conductive outer wall.

20 Claims, 5 Drawing Sheets

(51) Int. Cl.
*B41F 33/02* (2006.01)
*B41J 3/407* (2006.01)
*B41F 17/08* (2006.01)

(58) Field of Classification Search
USPC ...... 324/76.11, 457, 658; 101/38.1; 209/524
See application file for complete search history.

(56) References Cited

U.S. PATENT DOCUMENTS

| | | | |
|---|---|---|---|
| 4,621,903 A * | 11/1986 | Murano et al. | 359/252 |
| 4,915,237 A * | 4/1990 | Chang et al. | 209/524 |
| 5,969,605 A | 10/1999 | McIntyre et al. | |
| 2001/0039889 A1* | 11/2001 | Ackley | 101/38.1 |
| 2003/0010229 A1* | 1/2003 | Fujita et al. | 101/38.1 |
| 2003/0071727 A1* | 4/2003 | Haag et al. | 340/562 |
| 2006/0137548 A1* | 6/2006 | Vetter | 101/38.1 |
| 2006/0171728 A1* | 8/2006 | Ichimura et al. | 399/48 |
| 2009/0033041 A1* | 2/2009 | Jung | 277/644 |
| 2010/0013500 A1* | 1/2010 | Maher | B65B 57/10 324/663 |

FOREIGN PATENT DOCUMENTS

| | | |
|---|---|---|
| CH | 695555 A5 | 6/2006 |
| CN | 1720140 | 1/2006 |
| GB | 869126 | 5/1961 |
| JP | S39-13599 | 7/1964 |
| JP | S59-28655 | 2/1984 |
| JP | H05-52817 | 3/1993 |
| JP | 05-232072 | 9/1993 |
| JP | H06-3290 | 1/1994 |
| JP | H10-221307 | 8/1998 |
| JP | H11-156998 | 6/1999 |
| JP | 2005-531428 | 10/2005 |
| JP | 2007-003245 | 1/2007 |
| JP | 2007-285965 | 11/2007 |
| JP | 2007285965 A * | 11/2007 |
| SU | 1096602 | 6/1984 |
| WO | WO 03/106177 A2 | 12/2003 |

OTHER PUBLICATIONS

Official Action for New Zealand Patent Application No. 597967, dated Jul. 1, 2013, 2 pages.
Official Action for Australia Patent Application No. 2010280757, dated May 3, 2013, 4 pages.
Official Action (English translation) for Chinese Patent Application No. 201080039110.9 dated Oct. 18, 2013, 8 pages.
Official Action for Chinese Patent Application No. 201080039110.9 dated Aug. 6, 2014, 9 pages.
Official Action for European Patent Application No. 10751824.3, dated Apr. 1, 2015, 6 pages.
Official Action including English translation for Chinese Patent Application No. 201080039110.9 dated Dec. 25, 2014, 19 pages.
Official Action (without English translation) for Japanese Patent Application No. 2012-523329, dated Nov. 10, 2014, 3 pages.

* cited by examiner

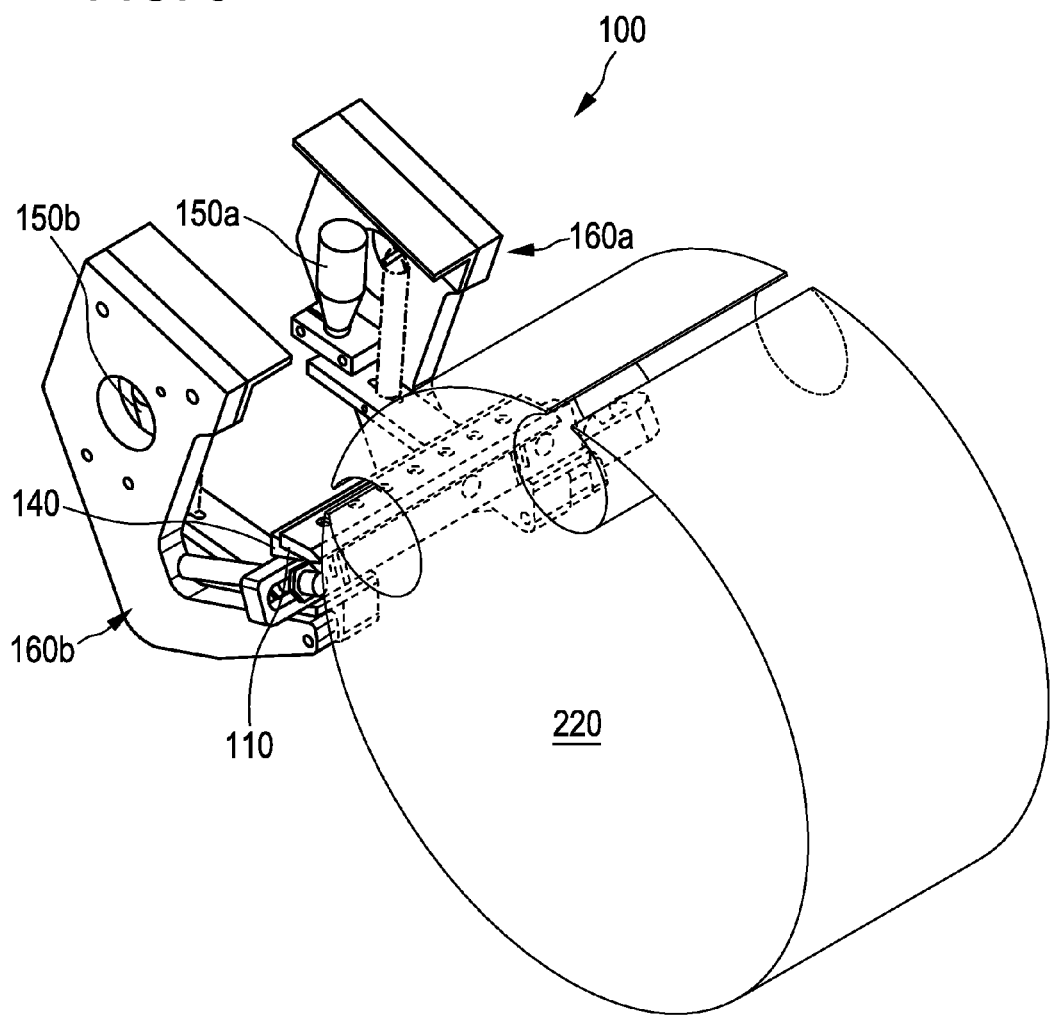

DEVICE AND METHOD FOR SURFACE PROCESSING HAVING A TEST STATION

CROSS REFERENCE TO RELATED APPLICATIONS

This application is a national stage application under 35 U.S.C. 371 of PCT Application No. PCT/EP2010/061369 having an international filing date of 4 Aug. 2010, which designated the United States, which PCT application claimed the benefit of German Application No. 10 2009 028 228.9 filed 4 Aug. 2009, the entire disclosure of each of which is incorporated herein by reference.

The invention relates to a device for treating surfaces of objects with rounded cross sections and at least one partially electrically conductive outer wall with a plurality of treating stations and a feed device with support devices for supporting objects to be treated, wherein the feed device is configured to transport the objects supported by a respective support device in a timed sequence from one treating station to another treating station.

The invention furthermore relates to a test station for a device for treating surfaces of objects with rounded cross sections and with at least one electrically conductive outer wall and a method for treating surfaces of objects with rounded cross sections and at least one electrically conductive outer wall including the steps of temporarily arranging objects to be processed at support devices of a feed device and timed transporting of the objects supported by the respective support device from one treatment station to another treatment station through the feed device.

Objects with rounded cross sections and an at least partially electrically conductive outer wall are e.g. beverage cans made form metal preferably aluminum or tin foil. Preferably the objects are configured rotation symmetrical, e.g. as hollow cylindrical containers with an open end and a closed end. Preferably only the outer wall of the hollow cylinder is treated, but not the outer surface of the closed end.

The surfaces of the outer walls of beverage cans are typically treated in a surface treatment device as recited supra before filling the beverage cans with filling material and closing the beverage cans with a can cover. Devices of this type are typically transfer lines in which a plurality of treatment stations is arranged along the transport direction of the object preferably with uniform spacing. Support devices for supporting the objects are also arranged preferably with uniform distances along the transport direction of the objects, so that the objects supported by the support devices are treated by the respective treatment stations in parallel and transported in a synchronized manner through the feed device to the respective next treatment station. Between the surface of the outer wall of the objects and the treatment stations there is a respective intermediary space or gap which can be less than 1 mm e.g. when treating the surfaces of beverage cans depending on the treatment performed.

The time available at the treatment stations for treating the respective objects corresponds to the cycle time minus the required transport time from one treatment station to the next and is therefore limited.

Possible treatment steps at the treatment stations are e.g. imprinting, drying and/or painting the objects. In order to perform the treatment steps, the treatment stations are configured with respective tools or treatment components. These tools or components are typically expensive precision equipment which can be damaged easily. In particular for short cycle times and a high treatment velocity damages occur over and over again at the devices in the treatment stations recited supra, wherein the damages can disturb the processing sequence and lead to a failure of one or plural treatment stations or the entire device which is disadvantageous. These downtimes cause high expenses and the increased scrap rate and/or complex repairs also cause high expenses.

Thus it is the object of the present invention to provide a device and a method for treating the surfaces of objects with rounded cross sections and an at least partially electrically conductive outer wall, wherein the method and the device are configured to mitigate or overcome one or plural of the recited disadvantages.

The object is achieved through a device as recited supra which is characterized in that one of the treatment stations is a test station and includes a voltage source, an electrode coupled with the voltage source and a processing unit wherein the processing unit is configured to detect voltage changes between the electrode and a respective object disposed at the respective test station.

The invention is based on the finding that damages at the treatment stations are often caused by irregularities like e.g. bulges, dents or beads in the surface of the outer wall or the outer contour of the objects to be treated. Due to the very tight gap between the treatment stations and the surface of the outer wall of the objects already very small irregularities in the surface of the outer wall or the outer contour of the objects of e.g. less than 0.5 mm lead to damages at the treatment stations. Furthermore, these irregularities can have the effect that the processing of the respective objects cannot be assured with the respective quality so that more scrap is produced. In case one or plural treatment stations are damaged typically operations of the device have to be interrupted in order to repair the treatment stations which can lead to expensive down time besides the expenses for the repair.

For example the distance between objects and a print head of a treatment station configured as print station for digitally imprinting objects is approximately 0.6 mm plus/minus 1.2 mm. Through irregularities in the surface of the outer wall of the objects the distance in some locations can be less than 0.3 mm. This can cause damages at the treatment station e.g. when a bulge in the surface of the outer wall of the object comes in contact with the treatment station. Furthermore the quality of the treatment results can decrease when the distance between the surface of the outer wall of the objects and the treatment station is small. For example only very inferior print results are achieved in a digital printing station when the distance between the surface of the outer wall of the object and the print head of the print station is less than 0.25 mm.

These disadvantages can be avoided through the device according to the invention since according to the invention one of the treatment stations is a test station which is used for detecting irregularities in the surface of the outer wall or the outer contour of the objects. According to the invention the test station thus includes a voltage source, an electrode coupled with the voltage source and a processing unit. Through the voltage source a voltage is built up between a respective object arranged at the test station and the electrode coupled with the voltage source. Irregularities in the surface of the outer wall or the outer contour of the objects lead to voltage changes between the electrode and the object. According to the invention the processing unit is configure to detect these voltage changes. This way irregularities in the surface of the outer wall or the outer contour of the objects can be determined quickly and reliably without requiring a direct contact between the test station and the surface of the outer wall of the objects.

Contrary to other possible solutions for detecting surface irregularities like e.g. optical detection through a camera or a detection through a laser scanner the present invention has the advantage that it can be implemented in a simple and cost effective manner and can be integrated without great complexity into the limited installation space provided in the device. Furthermore the test station according to the invention contrary to all other possible solutions is configured to provide a reliable detection also within the short time period available.

It is another advantage of the device according to the invention that information regarding the properties of the objects is generated through the processing unit through detection of the voltage changes between the electrode and a respective object arranged at the test station, wherein the information can be used for the subsequent treatment process.

Preferably the treatment unit is configured to process the detected voltage changes so that conclusions regarding type and extent of the irregularities in the surface of the outer wall or the outer contour of the objects can be drawn.

Preferably the test station is calibrated so that irregularities in the surface of the outer wall of the objects that include a height increase of less than 500 µm can be detected. Further preferably the time for detecting voltage changes and thus surface irregularities is less than 1 µs.

Preferably the electrode has the same length in longitudinal direction as a respective object that is arranged at the test station has in longitudinal direction. This way it can be provided that the object can be tested over its entire length with respect to irregularities in the surface of its outer wall. When the objects to be treated are beverage cans they can have a length or height of 160 mm so that also a respective length of the electrode is preferred in order to be able to detect the entire length or height of the beverage cans.

Further preferably the contour of the electrode is adapted to the contour of the objects to be treated or the contour of the electrode can be adapted to the contour of the objects to be treated. This way it is facilitated to test objects with different shapes with the test station.

Preferably the test station is arranged in front of one or plural treatment stations so that irregularities in the surface of the outer wall of the object can be detected before the objects are processed at additional treatment stations. This way further treatment can be stopped in an advantageous manner and/or objects with irregularities can be sorted out when the detected irregularities undercut a particular value, in particular when the surface of the outer wall of the objects has warps or bulges which are greater than the distance of the surface of the outer wall of the objects and the treatment stations. It is particularly preferred that one of the treatment stations is a print station which is arranged subsequent in transport direction of the feed device of the test station and which is configured to imprint a surface of a respective object arranged at the print station with liquid paint. A print station of this type includes highly sensitive print heads which are arranged at a very small distance above the surface of the outer wall of a respective object arranged at the print station. Irregularities in the surface of the outer wall of the objects can cause large damages at a print station and can lead to inferior printing results so that it is preferred in particular to provide a test station according to the invention upstream of a print station.

Preferably the processing unit is configured to generate a signal when a voltage change is detected between the electrode and a respective object arranged at the test station and/or when a voltage change detected between the electrode and an object arranged at the test station exceeds or undercuts a particular threshold value.

Generating a signal through the processing unit when a voltage change occurs or when a detected voltage change deviated from a particular threshold value or threshold value range advantageously provides the option to use this signal further, in particular in the control of the device. The signal can be used e.g. for stopping the device and to interrupt further processing of the objects in order to prevent damaging the treatment stations through an object with irregularities in the surface of the outer wall.

Further preferably the device is configured to remove an object to be processed from the respective support device when a voltage change between the electrode and the object is detected at the test station and/or when a voltage change detected at the test station between the electrode and the object exceeds or undercuts a particular threshold value.

The particular threshold value which shall not be exceeded or undercut or the threshold value range to be maintained is preferably selected so that non critical irregularities do not cause a signal or do not cause a removal of the object, critical irregularities, this means irregularities which could lead to damages or quality reductions, however cause a signal to be generated.

A particularly preferred measure when detecting a voltage change and/or a deviation of a detected voltage change from a particular threshold value or threshold value range is to remove the object that causes the voltage change from the support device. This can be preferably performed by expelling the object from the support device through compressed air. Removing an object with irregularities in the surface of the outer wall has the advantage that an interruption of the processing of the object does not have to be performed through the device and simultaneously damaging the device through an object with irregularities in the surface of the outer wall can be prevented. This way down times and associated costs due to interruptions of operations of the device which are caused by damages to the treatment stations and also by treatment stops which are caused by the detection of objects with irregularities in the surface of the outer wall can be prevented.

It is particularly preferred to use air as dielectric material between the electrode and an object arranged at the test station. This way other dielectric materials like e.g. liquid electrolytes do not have to be provided at the test station.

Further preferably the test station includes devices for adjusting a distance between the electrode and a respective object arranged at the test station. By varying the distance of the electrode from the surface of the outer wall of a respective object the test station can be adapted to different objects and the distance can be selected so that harmless, in particular very small irregularities in the surface of the outer wall of the objects can pass the test station. When testing beverage cans the distance between the electrode and the surface of the outer wall of the beverage can is adjustable to approximately 300 µm. The electrode is preferably adapted to the contour of the object, wherein the distance between the object and the electrode is preferably constant.

Preferably the voltage source is a DC voltage source, additionally preferably a high voltage DC voltage source. It is preferable that an adjustable DC high voltage of approximately 200-800 V is applied to the electrode. Further preferably the voltage source is configured with high resistance in order to generate a creep voltage that is as small as possible, preferably in the micro ampere range for safety reasons.

Irregularities in the surface of the outer wall of the objects like e.g. bulges, indentations or dents change the distance between the electrode and the object so that an electric arc forms between the object and the electrode and a short circuit is created and a discharge in particular an arc occurs between the electrode and the object. Continuous measurement of the applied high voltage which is essentially constant for an even surface of the outer wall of the objects helps to detect voltage changes through discharge due to surface irregularities. A suitable choice of the distance of the object from the electrode and the high voltage can preferably facilitate defining a limit, in particular a threshold value from which e.g. irregularities in the surface of the outer wall of the objects are detected.

Furthermore the test station is configured to detect voltage changes between the electrode and a respective object arranged at the test station without requiring a contact between the electrode and a respective object arranged at the test station. Thus it is facilitated to not only detect such irregularities in the surface of the outer wall of the objects which are greater than the distance between the electrode and an object arranged at the test station, thus leading to a contacting detection, but also to detect irregularities in the surface of the outer wall of the objects contactless which are smaller than the distance between the electrode and a respective object at the test station and thus only reducing this distance. This way a more precise detection of different irregularities in the surface of the outer wall of the objects is provided, thus a contacting and also a contact less detection of voltage changes between the electrode and a respective object arranged at the test station is provided.

Preferably the support device is configured so that a respective object supported by the support device is grounded when it is arranged at the test station.

Preferably the electrode is configured as comb electrode with a plurality of comb tips, wherein preferably the distance between two adjacent comb tips is less than 1 mm, in particular approximately 0.5 mm. Configuring the electrode as a comb is preferred in particular in order to concentrate the electric field at the tips of the electrode which are preferably oriented towards the object. Configuring the electrode as a comb furthermore has the advantage that a higher potential is provided between the comb electrode and the object at the comb tips and distance changes can be detected more easily.

Preferably the support devices are configured to rotate a respective supported object about a respective rotation axis. In particular for rotation symmetrical objects it is preferred to rotate these under respective support devices so that the treatment stations can be configured fixated in place and can simultaneously treat the entire outer surface of the rotation symmetrical objects. For beverage cans the surface to be treated or tested is the length or the height of the beverage can multiplied with its circumference. For an electrode preferably adapted to the length or height of a beverage can the entire outer wall of the beverage can be advantageously tested through rotating the beverage can. The speed of rotation of the objects on the respective support devices is preferably approximately 300 RPM. In particular for such a high speed of rotation it is advantageous that the test device according to the invention operates with a rather short detection time of less than 1 µs at 300 RPM.

Another embodiment of the invention is a test station for a device for treating surfaces of objects with rounded cross sections and an at least partially electrically conductive outer wall which is characterized in that the test station includes a voltage source, an electrode coupled with the voltage source and a processing unit, wherein the processing unit is configured to detect voltage changes between the electrode and a respective object arranged at the test station. The test station can preferably be configured with the features or feature combinations for the test station described supra.

The test station according to the invention and its embodiments are configured in particular for use in a surface treatment device for objects with rounded cross sections and an at least partially electrically conductive outer wall, in particular a device as described supra and its embodiments.

Another embodiment of the invention is a method recited supra for treating surfaces of objects with rounded cross sections with an at least partially electrically conductive outer wall which is characterized by the steps generating a voltage between an electrode and an object arranged at a treatment station configured as a test station, detecting voltage changes between the electrode and a respective object arranged at the treatment station configured as a test station.

The method according to the invention can be improved by the step of using air as a dielectric material between the electrode and a respective object arranged at the test station.

The method can be further improved by the step of generating a signal when a voltage change between the electrode and a respective object arranged at the respective test station shall be detected and/or when a voltage change detected between the electrode and a respective object arranged at the test station exceeds or undercuts a particular threshold value.

The method can furthermore be improved through the step of removing an object to be treated from the respective support device when a voltage change between the electrode and the object is detected at the test station and/or when a voltage change detected at the test station between the electrode and the object exceeds or undercuts a particular threshold value.

The method can be further improved through the step of adjusting a distance between the electrode and an object arranged at the test station.

The method can be further improved in that the generated voltage is a DC voltage, preferably a high DC voltage.

The method can be further improved through the step of grounding a respective object arranged at the test station.

The method can be further improved through the step of rotating a supported object about a rotation axis.

The method can be further improved through the step of detecting voltage changes between the electrode and an object arranged at the test station without a contact between the electrode and the object arranged at the test station being required.

Regarding the advantages, embodiments and details of these additional aspects of the invention and their improvements reference is made to the respective aspects of the device according to the invention described supra which are relevant for the respective additional aspects of the invention.

A preferred embodiment of the invention is now described in an exemplary manner based on the appended drawing figures, wherein:

FIG. 3 illustrates a three dimensional view of the embodiment without beverage can illustrated in FIG. 2;

FIG. 4b illustrates an enlarged detail of the electrode illustrated in FIG. 4a;

Figure 1:
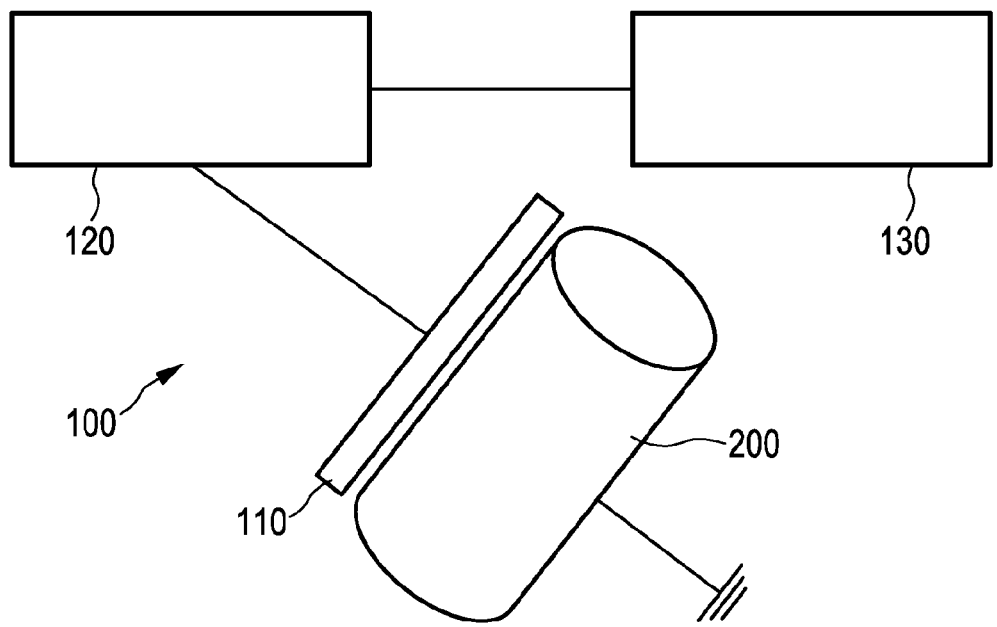
FIG. 1 illustrates a schematic view of an embodiment of a test station according to the invention and a beverage can.
Figure 2:
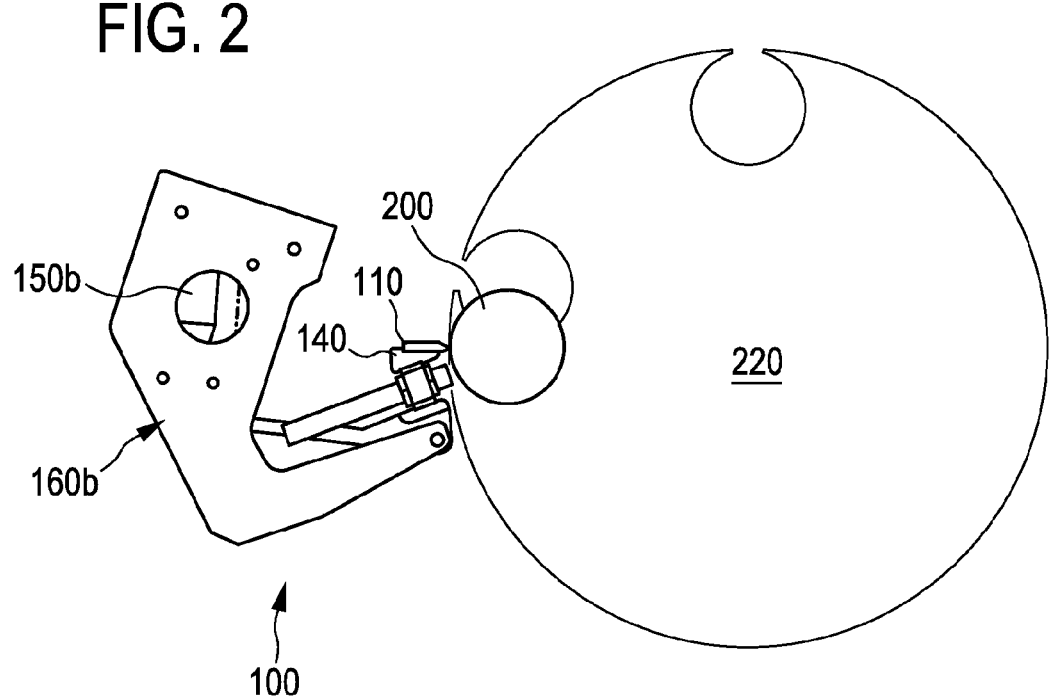
FIG. 2 illustrates a lateral view of an embodiment of a test station according to the invention with a beverage can.

FIG. 1 illustrates that the test station 100 for detecting surface irregularities of a beverage can 200 includes an electrode 110 which is arranged at a short distance from the beverage can 200 and connected with a DC power source 120 and a processing unit 130. The DC power source 120 preferably delivers a high voltage of approximately 800 V. The can 200 is grounded. Between the electrode 110 and the beverage can 200 there is air as a dielectric material. According to the invention an electrical field is established between the electrode 110 and the beverage can 200 through the AC power source 120 so that a voltage change can be detected by the processing unit 130 when irregularities in the surface of the outer wall of the beverage can 200 occur, so that surface irregularities can be detected. The processing unit 130 continually measures the high voltage applied to the electrode 110 and detects deviations in this voltage.

As apparent from FIGS. 2, 3 and 5 through 7 the electrode 110 is attached to an insulator 140 which in turn is retained in a support 160a, b. The support 160a, b includes devices 150a, b, e.g. dial indicators for adjusting a distance between the electrode 110 and the beverage can 200. This way the distance of the electrode 110 from the beverage can 200 can be exactly adjusted to the required boundary conditions. The distance between the electrode 110 and the beverage can 200 is preferably 300 µm.

The can 200 is preferably rotatably supported, wherein the speed of rotation is preferably 300 RPM.

When the distance between the beverage can 200 and the measuring electrode 110 is reduced through irregularities, e.g. bulges of the surface of the outer wall of the beverage can 200 this causes discharges or an arc between the electrode 110 and the beverage can 200 which causes a voltage drop which is detected by the processing unit. Thus, it is possible to also detect irregularities through the distance change, wherein the irregularities are smaller than the distance between the electrode 110 and the beverage can 200, this means also contactless detection is feasible. Preferably the processing unit transmits the voltage change through a signal to a superimposed control, preferably a memory programmable control (MPC). The amount of the voltage drop in which a respective signal shall be generated is preferably adjustable. The superimposed control of the device in case of a respective voltage drop initiates e.g. removing the object causing the voltage drop or an interruption of operations of the device. The time for detecting a surface irregularity is preferably approximately 1 µs or less.

Removing an object, in particular a beverage can 200 with surface irregularities, is preferably performed by expelling the beverage can 200 from its support through compressed air.

Figure 4A:
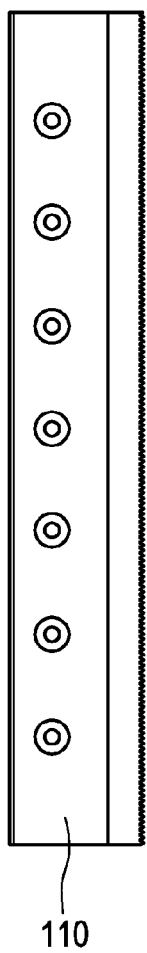
FIG. 4a illustrates the electrode of the embodiment illustrated in FIGS. 2 and 3.
Figure 4B:
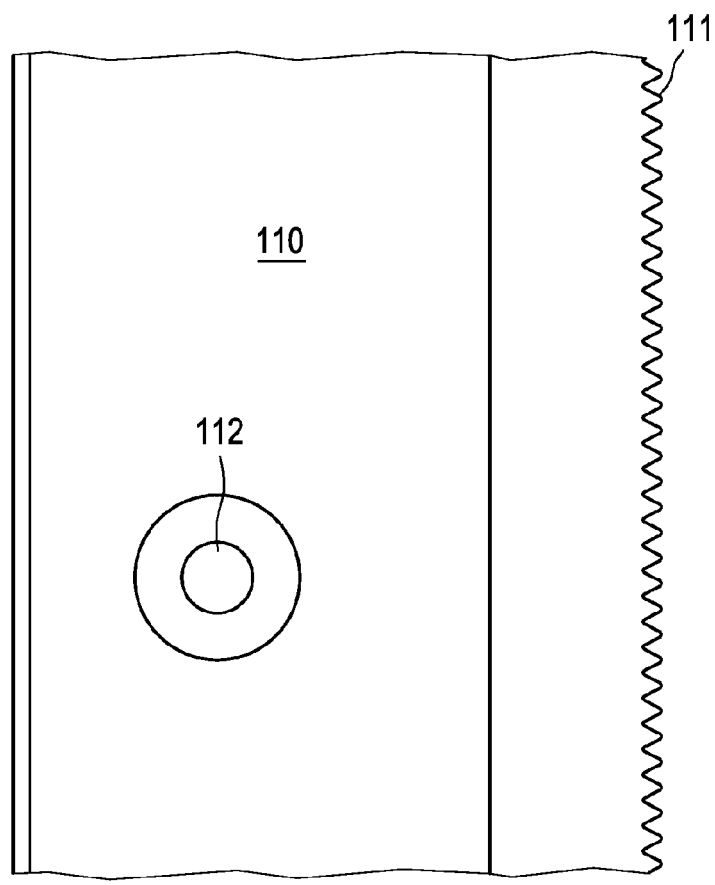
Figure 5:
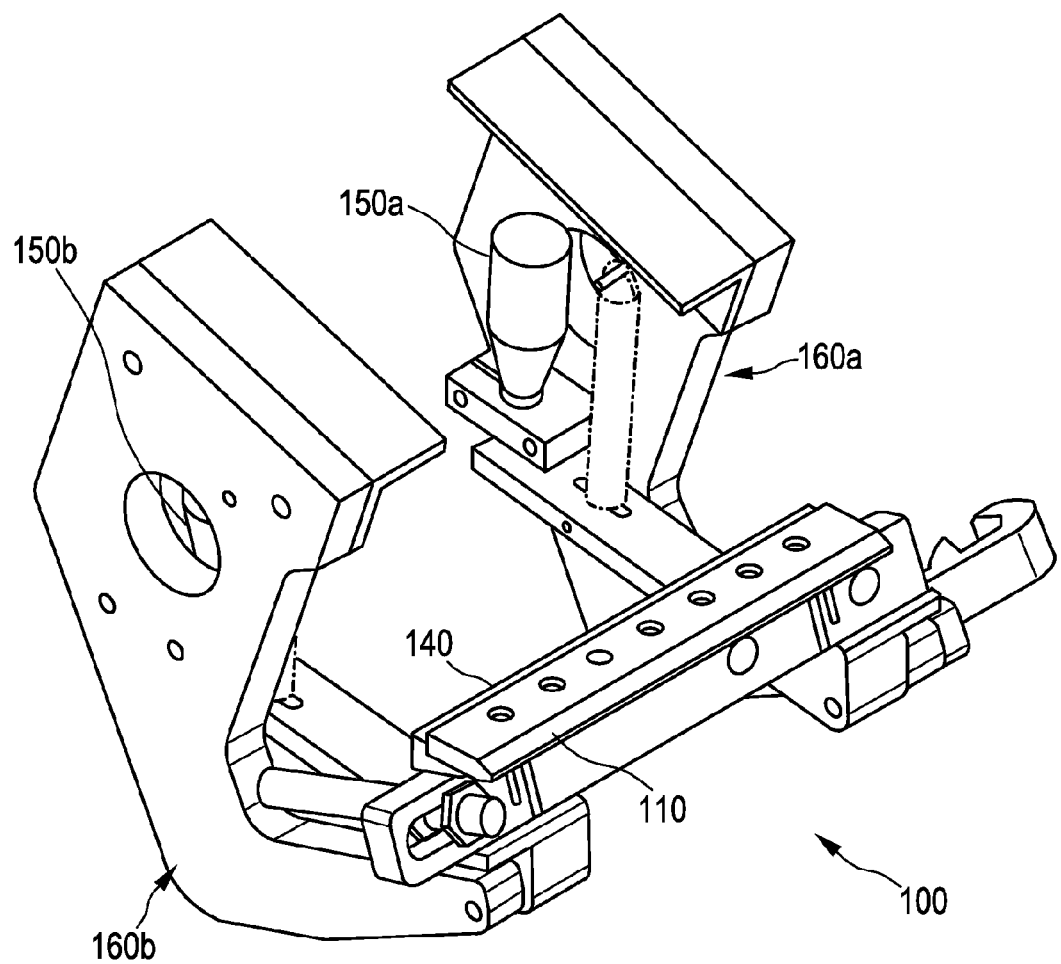
FIG. 5 illustrates another three dimensional view of the embodiment illustrated in FIGS. 2 and 3.
Figure 6:
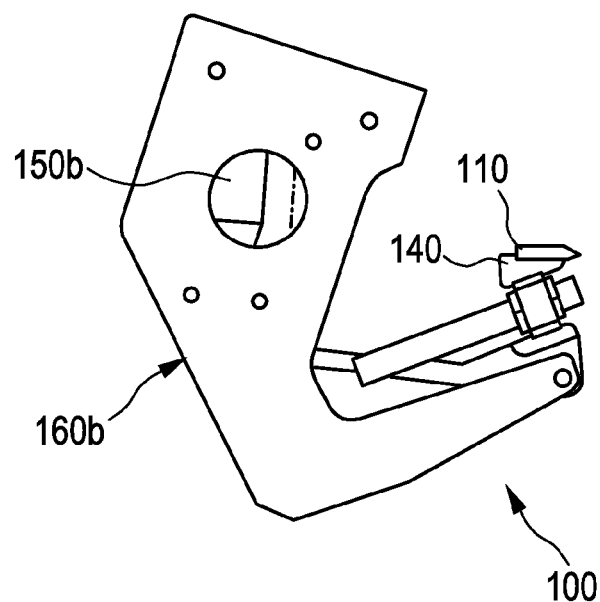
FIG. 6 illustrates a lateral view of the embodiment illustrated in FIGS. 2, 3 and 5.
Figure 7:
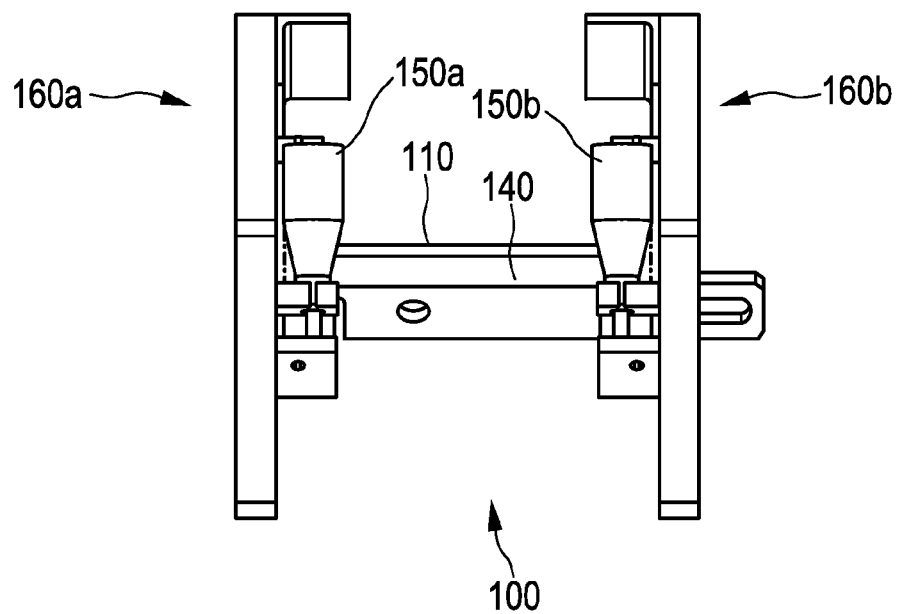
FIG. 7 illustrates a rear view of the embodiment illustrated in FIGS. 2, 3, 5 and 6.

As apparent from FIGS. 4a and 4b the electrode 110 is preferably configured as comb electrode with a plurality of comb tips 111 which are preferably arranged at a distance of approximately 0.5 mm from one another. A comb electrode is preferred in particular because there is a higher potential between the tips of the comb electrode and the can and the distance reduction can be detected more easily. The electrode 110 furthermore includes attachment devices 112 for attaching the electrode at the test station, in particular an insulator 140. The electrode 110 with respect to its longitudinal extension substantially corresponds to the longitudinal extension of the beverage can 200 as apparent from the schematic illustration in FIG. 1.

Further preferably the contour of the electrode 110 is adapted or adaptable to the contour of the beverage can 200 or of another object, so that objects with different shapes can be tested by the test station.

The invention claimed is:

1. A device for treating surfaces of metallic containers with rounded cross sections and at least one partially electrically conductive outer wall, comprising:
a plurality of treating stations; and
a feed device including support devices for supporting metallic containers to be treated,
wherein the feed device is configured to transport the metallic containers supported by the
support devices in a timed sequence from one treating station to another treating station,
wherein one of the treating stations is a test station and includes:
a voltage source;
an electrode coupled to the voltage source and provided to detect voltage changes between the electrode and a metallic container at the test station, the electrode further coupled with
a processing unit; and
a first adjuster and a second adjuster for adjusting a position of the electrode such that a distance between the electrode and the metallic container at the test station may be varied,
wherein the distance between substantially the entire length of the electrode and a central longitudinal axis of the metallic container is constant,
wherein the processing unit is configured to detect a voltage change between the electrode and
the metallic container at the test station,
wherein information generated through the processing unit can be used for subsequent treatment processes, and
wherein the device is configured to remove the metallic container from a support device
when the voltage change between the electrode and the metallic container varies by a predetermined amount from a threshold value.

2. The device according to claim 1, wherein air is used as a dielectric material between the electrode and the metallic container arranged at the test station.

3. The device according to claim 1, wherein the voltage source is a DC voltage source, preferably a high voltage DC voltage source.

4. The device according to claim 1, wherein the test station is configured to detect the voltage change between the electrode and the metallic container at the test
station without requiring a contact between the electrode and the metallic container.

5. The device according to claim 1, wherein the support device is configured so that the metallic container supported by the support device is grounded when it is
arranged at the test station.

6. The device according to claim 1, wherein the electrode is configured as a comb electrode with a plurality of comb tips, wherein preferably a distance between two adjacent comb tips is less than 1 mm, in particular approximately 0.5 mm.

7. A test station for a device for treating surfaces of containers with rounded cross sections and an at least partially electrically conductive outer wall, the test station comprising:
   a voltage source;
   a first adjuster associated with a first support;
   a second adjuster associated with a second support;
   an electrode interconnected to the first and second supports and coupled with the voltage source; and
   a processing unit,
   wherein the processing unit is configured to detect voltage changes between the electrode and a container arranged at the test station to detect irregularities in a height of the outer wall of the container;
   wherein the processing unit is configured to generate a signal when the voltage change between the electrode and the container varies by a predetermined amount from a threshold value such that the container can be removed from a support device that is supporting the container; and
   wherein the first adjuster and the second adjuster are operable to alter a position of the electrode such that a distance between the electrode and the container arranged at the test station may be varied.

8. The test station of claim 7, wherein the electrode is configured as a comb electrode with a plurality of comb tips, wherein preferably a distance between two adjacent comb tips is less than 1 mm, in particular approximately 0.5 mm.

9. A method for treating surfaces of metallic containers with rounded cross sections with an at least partially electrically conductive outer wall, comprising the steps of:
   temporarily arranging the metallic containers to be treated at support devices of a feed device;
   timed transporting of a metallic container supported by a support device from one treatment station to another treatment station through the feed device; generating a voltage between an electrode and the metallic container arranged at a treatment station configured as a test station, the electrode interconnected to first and second supports, the first support associated with a first adjuster and the second support associated with a second adjuster;
   maintaining a distance between substantially the entire length of the electrode and a central longitudinal axis of the metallic container arranged at the test station;
   detecting a voltage change between the electrode and a surface of the metallic container arranged at the test station;
   transmitting the detected voltage change to a processing unit, wherein information generated through the processing unit can be used for subsequent treatment processes; and
   expelling, with compressed air, the metallic container from the support device when the detected voltage change indicates an irregularity in the surface of the metallic container exceeds or undercuts a predetermined threshold value.

10. The method according to claim 9, further comprising; using air as a dielectric material between the electrode and the metallic container arranged at the test station.

11. The method according to claim 9, wherein the voltage generated is a DC voltage, preferably a high DC voltage.

12. The method according to claim 9, wherein, when detecting the voltage change between the electrode and the surface of the metallic container arranged at the test station, contact between the electrode and the metallic container is not required.

13. The test station of claim 7, wherein the distance between substantially the entire length of the electrode and a central longitudinal axis of the container is constant.

14. The device according to claim 1, wherein the first adjuster is associated with a first support and the second adjuster is associated with a second support, the electrode retained by the first and second supports.

15. The device according to claim 1, wherein the first adjuster is associated with a first half of the electrode and the second adjuster is associated with a second half of the electrode.

16. The device according to claim 1, wherein the first and second adjusters are interconnected to a longitudinal side portion of the electrode that is located distal to the metallic container at the test station.

17. The device according to claim 1, wherein the support devices rotate the metallic containers at about 300 rotations per minute.

18. The device according to claim 17, wherein, by rotating a metallic container at about 300 rotations per minute, the device can test the metallic container in less than about 1 µs.

19. The device according to claim 1, wherein the test station is operable to detect irregularities of less than about 500 µm in a surface of the outer wall of the metallic container.

20. The device according to claim 1, wherein the device is configured to use compressed air to remove the metallic container from the support device.

* * * * *